June 25, 1957 G. B. RINGHAM ET AL 2,796,681
APPARATUS FOR INSTRUCTION OR TRAINING IN NAVIGATION
Filed Sept. 10, 1952
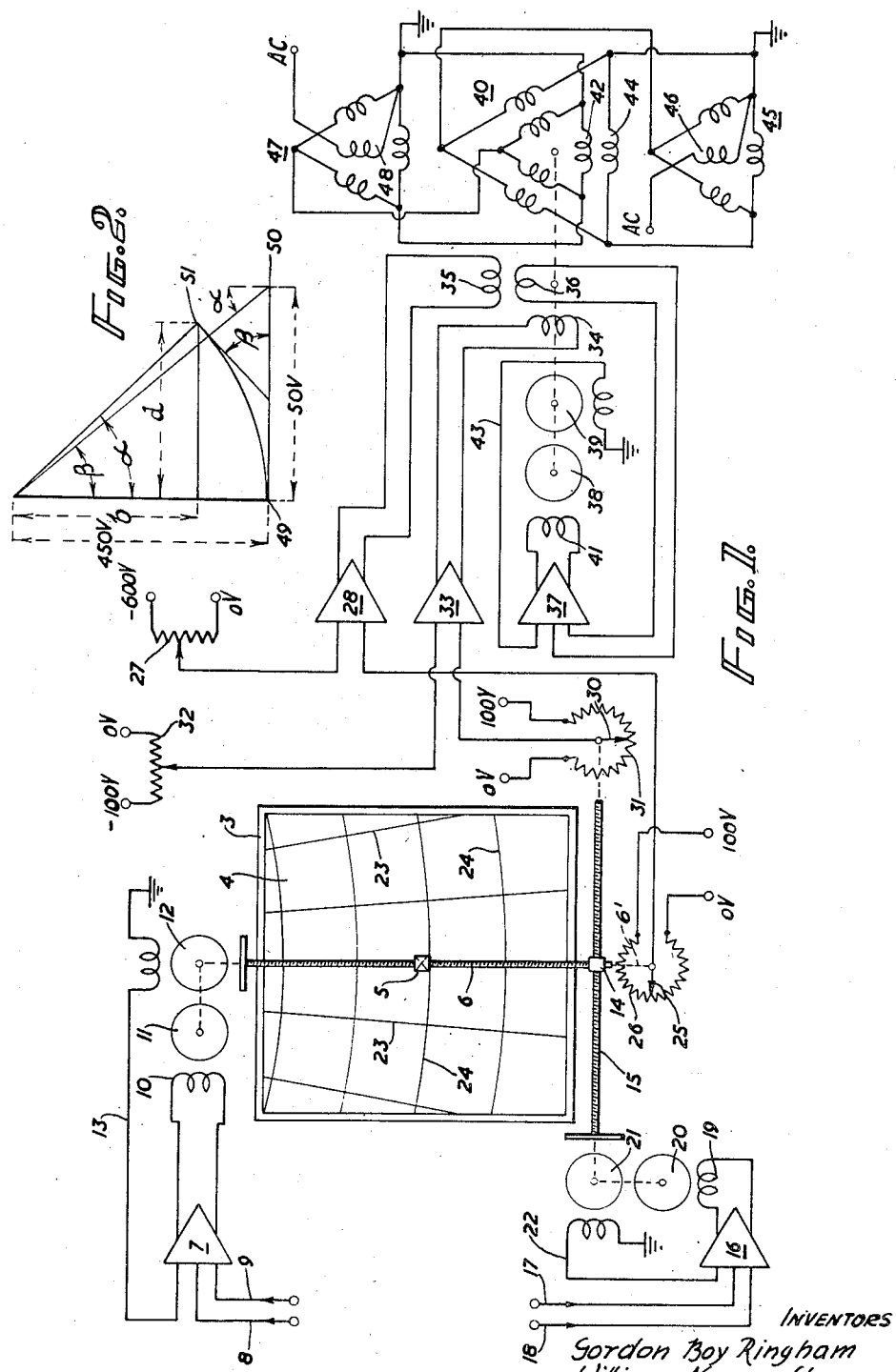
INVENTORS
Gordon Boy Ringham
William Norman Staynes
By Richard ⟨signature⟩

United States Patent Office 2,796,681
Patented June 25, 1957

2,796,681

APPARATUS FOR INSTRUCTION OR TRAINING IN NAVIGATION

Gordon Boy Ringham, Croydon, and William Norman Staynes, London, England, assignors to Communications Patents Limited, London, England Application September 10, 1952, Serial No. 308,762

8 Claims. (Cl. 35—10.2)

This invention is concerned with apparatus, for instruction or training in navigation, of the kind incorporating means for indicating or recording the "movement" of a simulation craft which is being controlled by a pupil or pupils. Apparatus of this kind enables highly satisfactory instruction or training to be given to one or more pupils, without necessitating the use of real craft, and constitutes a valuable contribution to the art of navigation.

The invention is particularly applicable to that type of such apparatus adapted for instruction or training in aerial navigation and involving means for indicating or recording the ground path "flown" by a simulation aircraft.

A basic element of such apparatus is a chart, for the use of an instructor, of the earth's surface over which the synthetic movement is made and although, in many cases, charts having rectangular co-ordinates have been used for this purpose, these are, in general, quite unsuitable to represent a large area of the earth's surface unless considerable inaccuracy can be tolerated. In this respect it seems that charts which provide a substantially constant scale are highly desirable for this purpose and, in particular, such charts in which the meridians are represented by converging straight lines whilst the parallels are represented by arcs of circles which are centred at a common point of intersection of said straight lines. Several known forms of map projection satisfy this requirement. For example, there is the simple conical with one standard parallel, conical with two standard parallels and secant conic. The invention also seems to be applicable to any of the polar zenithal projections such as the polar zenithal equal area, equidistant or stereographic projections, these being in reality conic projections in which the constant of the cone is made equal to unity. It can also be applied to a straight meridian polyconic projection, such as the polyconic international (one-in-a-million) projection, in cases where the centres of the arcs representing the parallels in the chart in use are sufficiently close to enable the error, introduced by the assumption that the arcs are concentric, to be ignored. Conveniently and for the purpose of this specification, charts based upon such forms of projection will hereinafter be referred to as straight meridian conic charts.

In the case of the simple conical projection, distances along the standard parallel are accurate but distances along other parallels become more inaccurate as the distance from the standard parallel increases. In those forms of projection involving two standard parallels the distances along said two parallels are accurate, the distances along intermediate parallels are a little too short and the distances along parallels which are outside the two standard parallels are a little too long; nevertheless serious errors are not necessarily introduced by assuming the scale to be constant.

When straight meridian conic charts are used, a great circle course can be indicated by a straight line without appreciable error. This is an advantage when radio bearings are involved but unfortunately this type of chart has the disadvantage that a rhumb line course cannot be represented by a straight line since such a line would have different angular relationship with every meridian. Nevertheless, the use of straight meridian conic charts is considered desirable for the use of instructors and accordingly it is amongst the objects of the present invention to provide novel apparatus for instruction or training in navigation whereby corrections are introduced automatically to enable such charts to be used more satisfactorily. Another object of the invention is the provision of such apparatus which includes novel means whereby it can be made to operate satisfactorily with such charts of different regions or of different scale. Broadly, apparatus according to the invention is distinguished in that it incorporates means operating automatically to introduce corrections such that, in following a magnetic compass course and with reference to such a straight meridian conic chart, the meridians of the chart will be cut by the indicating or recording means at substantially the same angles.

According to one aspect of the invention, an apparatus for instruction or training in navigation of the kind set forth and pertaining to the use of a straight meridian conic chart, comprises a movable indicating or recording element, means serving to obtain relative movement of said element and such a chart as a function of the synthetic movement of the simulation craft, and means ensuring that the said element cuts the meridians of the chart at substantially constant angles when the simulation craft moves on a magnetic compass course.

According to another aspect of the invention, an apparatus for instruction or training in navigation of the kind set forth and pertaining to the use of a straight meridian conic chart, comprises a movable indicating or recording element, means serving to obtain movement of said element with respect to said chart in two normal directions as a function of the synthetic movement of the simulation craft, and means for applying to a magnetic compass system, during movement of the indicating or recording element with respect to the chart, a correction which ensures that the indication given by the said compass agrees with the heading of the simulation craft with respect to the said chart.

According to a further aspect of the invention, an apparatus for instruction or training in navigation of the kind set forth and pertaining to the use of straight meridian conic charts, comprises a movable indicating or recording element, means serving to obtain movement of the said element in two normal directions, relative to the chart, as a function of the synthetic movements of the simulation craft, computing means for determining the deviation between the indication of a magnetic compass system and the heading of the simulation craft as indicated by the movement of the said element with respect to the chart, the said computing means including personally-operable means adjustable in accordane with the relationship between the north-south length of the chart and the distance between the chart and the common pole point of the projection upon which the chart is based, to enable the use of charts of different regions or different scales.

In preferred embodiments of the invention, means are provided for obtaining two electrical quantities, for example two electric potential differences, which in combination are representative of the position of the indicating or recording element with respect to the chart, and means whereby these two electrical quantities are employed to control the effect of electro-mechanical arrangements whereby appropriate angular corrections are introduced into an associated heading system. These electro-mechanical arrangements can comprise a magnetic resolver which, in co-operation with a "follow-up" servo-system, serves to obtain predetermined angular displacements of a shaft in response to relative displacements of the indicating or recording element and the chart, said shaft being arranged and adapted to actuate a device of the "Selsyn" type whereby an appropriate modification of the indication of an associated magnetic compass system, which can be a simulation system, is obtained.

One particular embodiment of the invention pertaining to a flight navigational trainer will now be described, by way of example only, with reference to the accompanying drawings wherein:

Fig. 1 shows, diagrammatically, apparatus according to the invention for modifying the indication of a magnetic compass system in accordance with the position of a recording element on a navigational chart, and Fig. 2 illustrates the operation of the apparatus shown in Fig. 1.

This apparatus includes a flight-recording mechanism which comprises a frame 3 for accommodating a navigational chart 4 and a recording pen 5 which is adapted to co-operate with the surface of this chart. This recording pen is mounted on a vertical (north-south) lead-screw 6 which is adapted to be rotated, in one direction or the other, in accordance with the north-south ground speed of the simulation aircraft, such rotation serving to displace the recording pen along the lead-screw in a direction dependent upon the direction of rotation thereof. Electric signals, which are representative of the north-south wind speed and the north-south air speed of the said aircraft, are applied to an amplifier 7, by way of conductors 8 and 9 respectively, and the output from this amplifier, which output represents the north-south ground speed of the aircraft, is used to energise a winding 10 of a motor 11 so that the latter will rotate in one direction or the other according to whether the component of the velocity of the aircraft in the direction from north to south is positive or negative. This motor 11, in addition to driving a generator 12 which supplies a feedback signal to the amplifier 7, over a conductor 13, also drives the vertical lead-screw 6.

One end of the said lead-screw 6 is mounted in a bearing block 14 which is itself mounted on a horizontal (east-west) lead-screw 15. Rotation of the latter, in one direction or the other, in accordance with the east-west ground speed of the simulation aircraft, serves to displace the vertical lead-screw 6 bodily over the chart. The desired rotation of the lead-screw 15 is obtained by applying electric signals, which are representative of the east-west wind speed and the east-west air speed of the said aircraft, to an amplifier 16 by way of conductors 17 and 18 respectively, and utilising the outputs from this amplifier, which output represents the east-west ground speed of the aircraft, to energise a winding 19 of a motor 20 so that the latter will rotate, in one direction or the other, according to whether the component of the velocity of the aircraft in the direction from east to west is positive or negative. The motor 20, in addition to driving a generator 21, which supplies a feed-back signal to the amplifier 16 over a conductor 23, also drives the horizontal lead-screw 15.

It will be apparent that with this arrangement the pen 5 will be displaced along a line parallel to the lead-screw 6 in accordance with the north-south ground speed of the simulation aircraft and along a line parallel to the lead-screw 15 in accordance with the east-west ground speed of the aircraft. Furthermore, it will be apparent that this displacement of the pen 5 will thus represent the movement of the said aircraft with reference to rectangular north-south and east-west co-ordinates parallel to the said vertical and horizontal lead-screws respectively.

If it be assumed that the navigational chart 4 is based on a true conical projection, has straight-line meridians 23 converging to a pole (not shown) which is assumed to be four times the north-south dimension of the chart distant from the top of the said chart and the parallels of latitude 24 are concentric circles having the said pole as centre (each meridian therefore cutting all parallels at right angles), it will be seen that the course plotted by the pen 5 would lead to incorrect results, since a constant magnetic compass course would be represented by a straight line which would cross the meridians 23 at different angles. Means will now be described for modifying the indications of a magnetic compass system in such a manner that a trainee pilot, in maintaining a constant compass reading, will steer a course which will be represented on the conical chart as a constant compass course, that is to say as a curve.

The vertical lead-screw 6 is coupled mechanically, as by a shaft extension 6' shown as a broken line, to the wiper 25 of a potentiometer 26, which may be movable across the chart with the lead-screw 6 and across which a potential of 100 volts is established, in such a manner that the wiper is given the maximum potential when the pen 5 is at the top (north) of the chart 4 and the minimum potential when said pen is at the bottom (south) of said chart. The wiper of a further potentiometer 27, across which a potential of 600 volts is applied, is manually set to a position determined by the relationship of the vertical (north-south) dimension of the chart and the perpendicular distance between the lower edge of the chart and the pole to which the meridians 23 converge. For example, in this case the lower edge of the chart 4 is five chart lengths from the said pole and the wiper of the potentiometer 27 is set to give a potential of 500 volts.

The wipers of the potentiometers 26 and 27 are connected through suitable voltage reducing networks (not shown) having an attenuation factor of N, to an amplifier 28, where the output of the manual potentiometer 27 is combined, in polarity-opposed relationship, with that of the associated driven potentiometer 26, so that the output of this amplifier 28 is a function of the position of the pen 5 on the chart 4 with respect to the pole of the chart.

The horizontal lead-screw 15 is coupled mechanically to the wiper 30 of a potentiometer 31, across which a potential of 100 volts is applied, in such a manner that the wiper is given the maximum potential when the pen 5 is at the left-hand (west) side of the chart 4 and the minimum potential when the said pen is at the right-hand (east) side of said chart. The wiper of a further potentiometer 32, across which a potential of 100 volts is applied, is manually set to a position determined by the position of the "vertical" meridian of the chart, (that meridian which is parallel to the vertical lead screw) with respect to the chart frame 3. Usually the chart will be arranged with its vertical meridian centrally disposed with respect to the chart frame, in which case the manually-adjustable potentiometer will be set to provide an output of 50 volts, or, if this placing of the chart in the frame is adopted as standard, the east-west manual potentiometer can be replaced by a voltage divider with a fixed centre tapping. If however the vertical meridian of the chart is placed at the extreme left of the frame the manual potentiometer 32 will be set to give an output of 100 volts, and if the vertical meridian is at the extreme right of the frame, the potentiometer 32 will be set to give zero output. The wipers of potentiometers 31 and 32 are connected through suitable voltage reducing networks (not shown) having an attenuation factor of N, to an amplifier 33, where the output of potentiometer 32 is combined, in polarity-opposed relationship, with that of potentiometer 31. It will be seen that the output of the amplifier 33 is a function of the distance between the pen 5 and the vertical meridian, which is in this case the central meridian.

The outputs of the amplifiers 28 and 33 are applied to coils 35 and 34 respectively of a magnetic resolver.

The rotor coil 36 of this resolver provides an input signal for a follow-up servo system which comprises an amplifier 37, a motor-generator, 38 and 39, and a double-wound unit 40 of the Selsyn type. The input signal from the rotor coil 36 is fed, via the amplifier 37 to a winding 41 of the motor 38, which is mechanically coupled, through suitable gearing, to the rotor carrying the coil 36 of the magnetic resolver and to the rotor carrying the coils 42 of the Selsyn unit, the interconnections being such that the rotor of the resolver is orientated automatically to apply zero input to the amplifier so that its winding is at all times set at right angles to the resultant field established by the voltages applied to the two stator windings 34 and 35. The generator 39 provides velocity feed-back to the amplifier 37 by way of a conductor 43.

The stator windings 44 of the double-wound Selsyn unit 40 are connected to a further Selsyn unit 45 of which the rotor coil 46 is given a rotation representing the azimuth angle. The rotor coils 42 of the double-wound Selsyn unit 40 are connected to the stator coils of a Selsyn unit 47, so that the rotor 48 of the latter, which controls the magnetic compass indication, is given a rotation which is the sum of the rotations given to the rotor coils 42 and 46.

The co-operation of the various elements of such an arrangement will be understood more readily from a description of its operation, and for this purpose, it will be assumed, as in the example hereinbefore described that the conic projection upon which the chart 4 is based has a pole point which is four units of chart length (vertical axis) distant from its top edge, and that the vertical meridian of the chart is arranged centrally within the frame 3 and parallel to the vertical lead-screw 6. Accordingly, the manually-operable potentiometer 27 is set to provide an output of 500 volts in opposition to that of the associated driven potentiometer 26, and the manually-operable potentiometer 32 is set to provide an output of 50 volts in opposition to that of the associated driven potentiometer 31. Further, let the first position of the pen 5 be at the centre of the chart 4 and the relationship of the rotor and stator of the "Selsyn" unit 40 be arranged to give a compass reading of 90° in the simulation aircraft, for which the heading will be horizontal from left to right across the chart.

For this condition, the co-ordinates of the pen, expressed graphically and in terms of voltage, are $$X = +50, \quad Y = +50$$

The output of the horzontal potentiometer system (31 and 32) is $+50-50=0$ volts.

The voltage on the field coil 34 of the resolver is a fixed fraction, $1/N$th, of this output voltage and is therefore $0 \times 1/N = 0$ volts.

The output from the vertical potentiometer system (26 and 27) is $+50-500=-450$ volts.

The voltage on the field coil 35 of the resolver is $1/N$th of this output voltage and is therefore $$-450 \times 1/N = -450/N \text{ volts}$$

The rotor col 36 of the resolver will therefore rest at right angles to the field coil 35.

Now, let the simulation aircraft move to a new position for which the pen is at the right-hand edge of the chart. If no correction is applied to the magnetic compass, the latter will continue to indicate the heading as 90°. At this second position, the coordinates of the pen will be $X=0$, $Y=+50$.

The output from the horizontal potentiometer system is $0-50=-50$ volts.

The voltage on the field coil 34 of the resolver is $-50/N$ volts.

The output from the vertical potentiometer system is $+50-500=-450$ volts.

The voltage on the field coil 35 of the resolver is $-450/N$ volts.

The rotor coil 36 of the resolver will come to rest at right angles to the resultant field produced by the voltages $-50/N$, $-450/N$; namely at an angle $$\tan^{-1} 9/1 = 83°40'$$

Since the rotor, 42, of the "Selsyn" unit 40 is connected to the same shaft as the rotor of the resolver, an angular rotation will be applied to the compass of $$90° - 83°40' = 6°20'$$

and the simulation aircraft in its second position will therefore be represented as having a heading of $$90° + 6°20' = 96°20'$$

Referring to Fig. 2, in which the lateral distances and angles have been greatly exaggerated for the sake of clarity, if the aircraft has travelled from a first position at 49 to a second position at 50, the heading of the aircraft at point 50 is seen to be $90° + \alpha$. Furthermore, $\alpha$ is seen to be equal to $\tan^{-1} 50/450 = 6°20'$, and the compass indication of 96°20' is thus proved correct.

Now let the aircraft move the same distance as before from the first position to a third position 51, but along a parallel of latitude (i. e. constant compass course, 90°). In this case the pen has moved in an arc of a circle about the pole as centre, the radius of the arc being equal to 450 units and the length of the arc to 50 units. The angle $\beta$ which is also the change of azimuth angle, is equal to 50/450 radians, i. e.

$$\frac{50}{450} \times \frac{360}{2\pi} \text{ degrees}$$
$$= 6.369°$$
$$= 6°22'$$

Without correction, the compass would therefore indicate the heading at point 51 as $90° - 6°22' = 83°38'$.

Remembering that the co-ordinates of the first position 49, Fig. 2, are $X=+50$, $Y=+50$, it will be seen that the co-ordinates of the third position 51 are $X = 50 - a$
$= 50 - (450 \sin 6°22')$
$= 50 - (450 \times 0.1109)$
$= 50 - 49.905$
$= 0.095$ $Y = 50 + 450 - b$
$= 50 + (450 - 450 \cos 6°22')$
$= 50 + (450 - 450 \times 0.9939)$
$= 50 + (450 - 447.25)$
$= 52.75$ The output from the horizontal potentiometer system
$= 0.095 - 50$
$= -49.905$ volts The voltage on the field coil 34 of the resolver
$$= \frac{-49.905}{N} \text{ volts}$$

The output from the vertical potentiometer system
$= 52.75 - 500$
$= -447.25$ volts The voltage on the field coil 35 of the resolver
$$= \frac{-447.25}{N} \text{ volts}$$

The rotor coil 36 of the resolver will come to rest at right angles to the resultant field produced by the voltages $$\frac{-49.905}{N}, \frac{-447.25}{N}$$

It will come to rest at an angle $$\tan^{-1}\frac{-447.25}{-49.905}=83°38'$$

A rotation of 90°−83°38′=6°22′ will be applied to the compass, which would otherwise have indicated 83°38′, restoring the heading indication to 90°.

If it is desired to introduce appropriate corrections for magnetic variation, this can be done for example by rotating the stator of the double-wound "Selsyn" unit 40 through an angle corresponding to the value of the variation pertaining to the area under consideration. In some cases a rotation of the stator to correct for magnetic variation can be achieved automatically by means associated with one or both of the lead-screws 6 and 15.

When the area under consideration approaches the equator, it may be advantageous, in order to avoid the use of an unduly high voltage on the manually-adjustable potentiometer 27 of the vertical potentiometer system, to introduce an appropriate gearing, having for example a step down ratio of 2:1, and to reduce proportionately the voltage applied to the potentiometer; the error will be negligible owing to the flatness of the arcs representing the parallels of latitude.

What we claim is:

1. Navigational training apparatus for use with a simulation craft which includes a compass unit for use in steering the craft, comprising an element for indicating the course of the craft with respect to a straight-meridian conic chart, translating means for obtaining relative movement of said element and the chart as a function of the synthetic movement of the craft, computing means operable, in accordance with the assumed movement of said craft, with respect to a datum which has a predetermined relationship with the pole of the projection on which the chart is based, said computing means serving to provide data representing the angular deviation made by the meridian which passes through the point on the chart indicated by said element with a predetermined reference axis, and correction means controlled by said computing means for applying to the compass unit an angular correction equal to said angular deviation.

2. Navigational training apparatus according to claim 1; wherein said computing means includes manually operable variable electrical means adjustable in accordance with the relationship between the north-south length of the chart and the distance between the chart and the pole of the projection on which the chart is based, whereby charts of different regions and on different scales can be used.

3. Navigational training apparatus according to claim 1; wherein said translating means includes two mutually perpendicular lead-screws for moving the indicating element in the two normal directions, and said computing means includes two potentiometers respectively coupled to said lead-screws so as to be driven thereby for establishing electric potential differences which are representative of the co-ordinates of the said element with respect to two reference axes respectively parallel to the said lead-screws and having an origin fixed with respect to the chart, and means for deriving electric potential differences representative of the co-ordinates of the said origin with respect to the pole of the projection on which the chart is based.

4. Navigational training apparatus according to claim 1; wherein said computing means includes means for deriving electric potential differences representative of the co-ordinates of the indicating element with respect to two mutually perpendicular reference axes having as origin the pole of the projection on which the chart is based, and a magnetic resolver having two mutually perpendicular stator coils to which the said potential differences are applied respectively and a rotor coil which assumes an angular position representative of the said deviation angle.

5. Navigational training apparatus for use with a simulation craft which includes a compass unit for use in steering the craft, comprising an element for indicating with respect to a straight-meridian conic chart the movement of the craft, translating means for producing relative movement of said element and the chart as a function of the synthetic movement of the craft, means operative to establish electric potential differences which are representative of the co-ordinates of the said element with respect to perpendicular reference axes having as origin the pole of the projection on which the chart is based, means controlled by said potential differences and operative to compute the angular deviation between the meridian which passes through the point on the chart indicated by the said element with one of the said reference axes, and correction means controlled by the said computing means and serving to apply to the compass unit a correction equal to said angular deviation.

6. Navigational training apparatus according to claim 5; wherein said computing means includes a magnetic resolver having two perpendicular stator coils to which said potential differences are respectively applied and a rotor coil, and a null servo unit to which said rotor coil of the resolver is connected, whereby the servo unit tends to rotate said rotor coil to an angular position representative of said angular deviation.

7. Navigational training apparatus according to claim 5; wherein said correction means includes a differential synchro system which includes a transmitter unit, a differential transmitter unit and a receiver unit, means operative to apply to the rotor of one of the transmitter units a rotation equal to the computed azimuth angle of the path of the craft, means operative to apply to the rotor of the other transmitter unit a rotation equal to said angular deviation, the compass unit being controlled by said receiver unit so that its reading is equal to the algebraic sum of said two rotations of the transmitter units.

8. Navigational training apparatus for use with a simulation craft which includes a compass unit for use in steering the craft, comprising an element for indicating the course of the craft with respect to a straight-meridian conic chart, means operative to control the compass unit primarily in accordance with the computed azimuth of the craft, translating means operative to move said element with respect to the chart in two normal directions in accordance with the north-south and east-west components respectively of the velocity of the craft, computing means operable, in accordance with the assumed movement of said craft, with respect to a datum having a predetermined relationship with the pole of the projection on which the chart is based, said computing means serving to provide data representing the angular deviation between the two normal directions and the meridian and parallel passing through the point indicated by the said element on the chart, and means for applying to the compass unit an angular correction equal to the said angular deviation, whereby the course indicated by the compass unit reading is in agreement with that indicated by the movement of the element with respect to the conic chart.

References Cited in the file of this patent

UNITED STATES PATENTS

| | | |
|---|---|---|
| 1,873,126 | Hugershoff | Aug. 23, 1932 |
| 2,338,536 | Plant-Carcasson | Jan. 4, 1944 |
| 2,389,359 | Grow | Nov. 20, 1945 |
| 2,393,474 | Jones | Jan. 22, 1946 |
| 2,413,300 | Dunn et al. | Dec. 31, 1946 |
| 2,445,673 | Kail | July 20, 1948 |
| 2,460,798 | McCarthy | Feb. 8, 1949 |
| 2,496,674 | Omberg | Feb. 7, 1950 |